United States Patent [19]

Dils

[11] Patent Number: 5,052,214

[45] Date of Patent: Oct. 1, 1991

[54] KNOCK DETECTOR USING OPTICAL FIBER THERMOMETER

[75] Inventor: Ray R. Dils, Vancouver, Wash.

[73] Assignee: Luxtron Corporation, Mountain View, Calif.

[21] Appl. No.: 293,228

[22] Filed: Jan. 3, 1989

[51] Int. Cl.[5] .............................................. G01L 23/22
[52] U.S. Cl. ..................................... 73/35; 364/431.08
[58] Field of Search .................... 73/35; 364/431.08; 374/131, 144

[56] References Cited

U.S. PATENT DOCUMENTS

| 4,364,260 | 12/1982 | Chen et al. | 73/35 |
| 4,393,687 | 7/1983 | Müller et al. | 73/35 |
| 4,424,706 | 1/1984 | Oh | 73/35 |
| 4,437,334 | 3/1984 | Laurenz | 73/35 |
| 4,446,723 | 5/1984 | Boning et al. | 73/35 |
| 4,576,486 | 3/1986 | Dils | 374/131 |
| 4,750,139 | 6/1988 | Dils | 364/557 |

OTHER PUBLICATIONS

"Optical Fiber Thermometer Measurements in Automotive Engines," by R. R. Dils and M. P. Moore, Reprint dated Feb. 1988 from *Advances in Instrumentation*, vol. 41.

Primary Examiner—John E. Chapman
Attorney, Agent, or Firm—Majestic, Parsons, Siebert & Hsue

[57] ABSTRACT

A knock detector for an internal combustion engine includes an optical fiber thermometer that senses variations in heat flow within an engine cylinder. The optical fiber thermometer includes a black body emitter disposed inside the cylinder which is heated by combustion gases to provide an optical output. The optical output is converted to an electrical signal whose fourier components are analyzed to determine whether a knock condition exists.

24 Claims, 7 Drawing Sheets

KNOCK DETECTOR USING OPTICAL FIBER THERMOMETER

BACKGROUND OF THE PRESENT INVENTION

The present invention relates to a method and apparatus for detecting the presence of knock within an engine cylinder of an internal combustion engine.

It is important in the design of high performance internal combustion engines that improved fuel consumption and maximum power must be obtained with acceptable exhaust manifold temperatures and emissions control. In order to sustain the performance of the engine under these constraints, the engine must often be operated near the knock limit. Some engines in high performance automobiles have knock control which is a part of a microprocessor-based engine control system. In these systems the spark is advanced until knock is detected and is then retarded slightly to eliminate knock while still maintaining high engine efficiency. In order to do this it is necessary to know when a knock condition exists.

In these engines knock is detected by analyzing cylinder pressure pulses or acoustic vibrations. For example, a pressure transducer may be installed near the cylinder and connected through a gas path. When knock occurs, higher frequency fourier components of the pressure pulse are detected using a fast fourier transform device or an electronic filter. The principal drawback to this system is that it is too expensive to use on production automobiles and has been therefore relegated to use only as a laboratory tool.

Another method utilizes an accelerometer or microphone attached to the cylinder head. When knock occurs, mechanical vibrations in addition to those generated by normal combustion and engine operation are generated in the cylinder head and are picked up by the sensor. These vibrations are in the kilohertz range and are processed with a fast fourier transform device or an electronic filter. The signal is then used to help control the engine operation. Thus, the system is only used in relatively expensive automobiles; moreover, it is sensitive to additional extraneous engine noise which may be associated with valve operations or other mechanical events occurring within the engine. Very high performance engines with additional cylinders or valves per cylinder generate so much additional noise, however, that the transducer is frequently unable to discriminate between extraneous engine noise and knock.

SUMMARY OF THE INVENTION

The present invention comprises a method and apparatus for the detection of knock in the engine cylinders of an internal combustion engine by sensing the variations in temperature or heat flow within the engine cylinder over a complete combustion cycle, by analyzing the fourier components of the signal thus measured, and by comparing these components with the same fourier components of the engine under normal operating conditions.

The invention utilizes a temperature sensor located inside the engine cylinder which is capable of withstanding the harsh engine cylinder environment and sensing rapidly changing variations in temperature over a complete combustion cycle and a fourier analysis device connected to the output of the temperature sensor which can resolve the temperature signal into a predetermined set of fourier components. A comparator compares the fourier components of the sensed temperature signal with thresholds representing an idealized set of fourier components representing normal engine operation, and when the measured fourier components vary by a predetermined amount with respect to the idealized fourier components, a signal is provided which indicates that a knock condition exists within the engine cylinder.

It is characteristic of the temperature change of a sensor located within the cylinder that the change becomes much more abrupt when a knock condition exists. The steep-sloped temperature pulse, representing a rapidly moving flame front, results in higher amplitudes for the higher order harmonic multiples of the combustion frequency. Under normal conditions, the higher order harmonics of the combustion frequency such as the second, third and fifth harmonics have relatively low amplitudes because the rate of heat flow from the cylinder gases to the sensor is more gradual. Thus, a comparison between the fourier components of the sensor temperature variations measured during knock with components representing normal engine operation will yield a marked disparity, sometimes as high as an order of magnitude, which can be easily detected.

The variations in gas temperature, pressure and velocity within the engine cylinder over a complete combustion cycle result in a periodic pulse of heat flow to the sensor which may be thought of as a temperature pulse which may be sensed by a black body emitter coupled to the end of an optical fiber. Apparatus of this type for making temperature or heat flow measurements within an engine cylinder is described in a paper entitled "Optical Fiber Thermometer Measurements in Automotive Engines," R. R. Dils and M. P. Moore, presented at ISA '86, International Conference and Exhibit Houston, Texas, October 13–16, 1986, page 1159. The measurements described in the ISA paper are made with an optical fiber thermometer of the type disclosed in U.S. Pat. No. 4,576,486, entitled "Optical Fiber Thermometer" the disclosure of which is incorporated herein by reference.

The optical fiber thermometer described above comprises a black body emitter affixed to the end of a sapphire rod which is inserted through a bore in the wall of the engine cylinder or incorporated in the engine sparkplug. The black body emitter emits light whose intensity is a function of the temperature of its surface which is heated by combustion products within the cylinder. An optical detector circuit, such as a photodiode, coupled to an amplifier, converts the light energy to an electrical signal which represents gas temperature within the engine cylinder.

Another feature of the present invention is the use of electronic compensation to compensate the electrical signal for the thermal lag of the black body emitter. Heat is transferred to the emitter from the high velocity, high temperature gases that result from combustion, but the frequency response of the black body emitter rolls off steadily as the frequency of heat flow variation increases. At lower frequencies the roll-off is proportional to $1/f$. As the frequency increases, the roll-off becomes proportional to the reciprocal of the square root of $f$ where $f$ is the combustion frequency. Electronic compensation is provided which boosts the high frequency output of the optical detector circuit by a factor which is either proportional to the square root of the frequency or to the frequency itself. Precision is not usually required for the compensation circuit because the fourier components of the optical detector output in the presence of knock vary from idealized fourier components by close to an order of magnitude. Thus, a rough approximation can be made in compensating the detector output for the transfer function of the black body emitter, and yet still be accurate enough to determine whether a knock condition exists.

The fourier analysis is conducted by a set of center frequency tunable notch filters which divide the compensated optical detector output into signals representing the fundamental of the combustion frequency and selected higher order terms. Since temperature changes within the engine cylinder become very abrupt when a knock condition exists, the amplitudes of some of the higher order harmonics of the combustion frequency will be much higher than normal. A comparator compares the amplitudes of these harmonics with the amplitudes that would be expected under normal operating conditions, and when there is variance between the respective amplitudes in a predetermined amount, a signal may be provided which indicates that a knock condition exists within the cylinder. The signal may then be used to retard the spark, change the air/fuel mixture or alter some other engine parameter in a closed loop system. Alternatively, the signal may be used to provide a warning, either visual or audible that a knock condition exists.

A second embodiment of the invention makes use of the fact that combustion within the cylinder during knock amounts almost to a detonation, such that there is very little time difference between the peak of the temperature pulse from one location to another. Thus, two temperature sensors may be placed within the cylinder, spaced a distance apart, and the occurrence in time during the combustion cycle of a threshold in the temperature response of each may be determined. The difference in time during a normal cycle of operation may be compared with the difference obtained when a knock condition exists. This time difference will be very short when the cylinder is knocking but will be longer during normal operation. A short time differential may generate a signal indicating that a knock condition exists.

It is a primary object of this invention to provide an inexpensive knock detector for an engine cylinder in an internal combustion engine.

A further object of this invention is to provide a knock detector for an internal combustion engine which utilizes a black body emitter to sense temperature changes within the engine and to provide a signal which undergoes fourier wave form analysis to determine whether a knock condition exists.

A still further object of this invention is to provide a method and apparatus for detecting knock within an engine cylinder of an internal combustion engine using two temperature sensors at different locations within the engine cylinder to sense the time difference between temperature thresholds to determine if a knock condition exists.

A still further object of this invention is to provide knock detection within an engine cylinder by sensing temperature within the engine cylinder with a black body emitter coupled to a photodetection circuit which is electronically compensated for the effect of thermal lag in the response of the black body emitter.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 1:
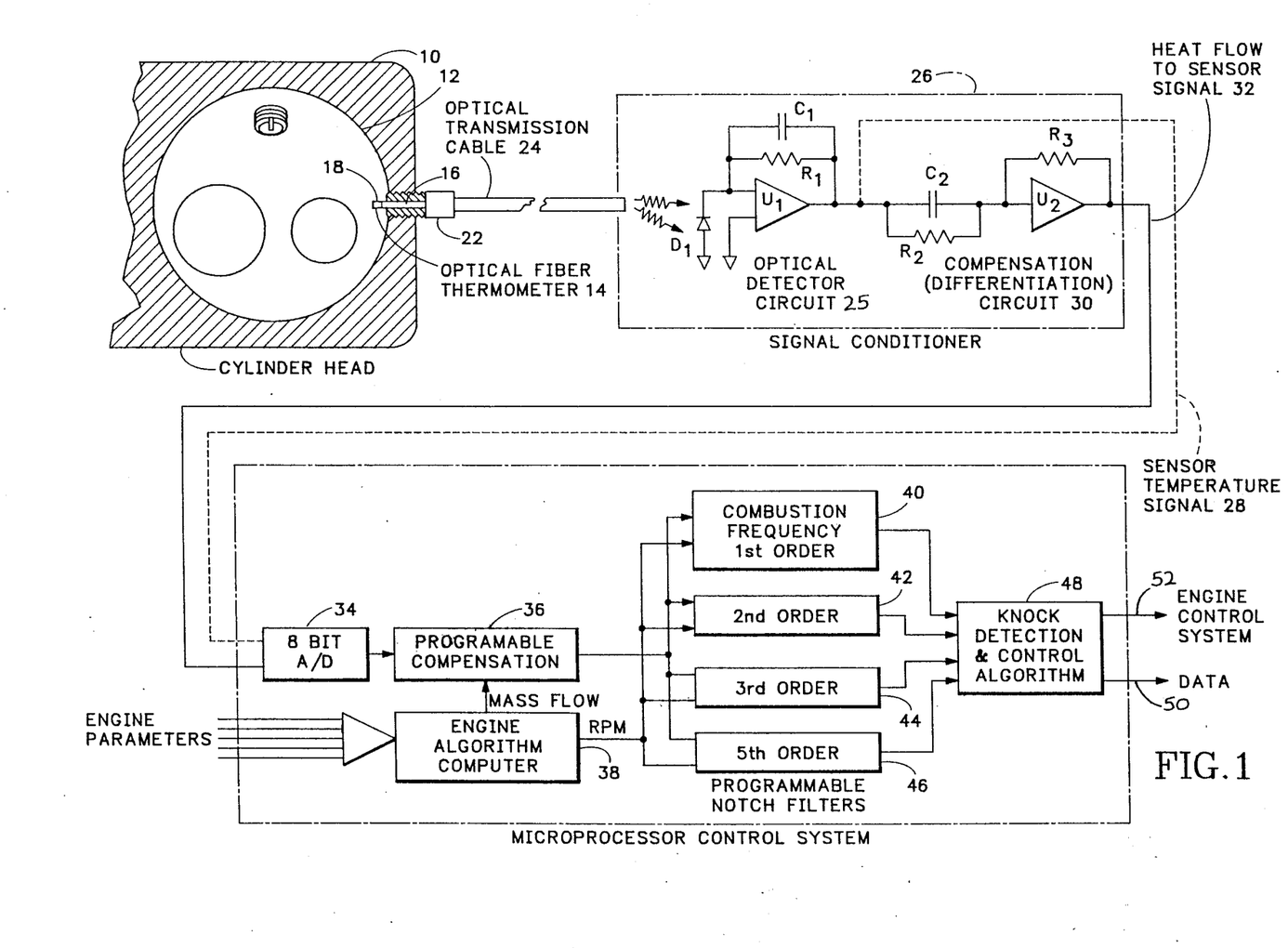
FIG. 1 is a block schematic diagram of an apparatus for detecting a knock condition within an engine cylinder using a single optical fiber thermometer element.

An internal combustion engine 10 includes a cylinder head 12 which may be one of the several cylinders in the engine. An optical fiber thermometer 14 comprises a sapphire rod 16 with a black body cavity 18 (also referred to herein as a sensor or emitter) formed on the tip thereof. The black body cavity 18 is created by sputtering a thin metallic or opaque oxide, coating on the surface of the fiber 16. The black body cavity 18 functions as an emitter, emitting light energy whose intensity is a function of its temperature as it is heated and cooled by gas flow within the cylinder head 12. The sapphire rod 16 is connected through a bore in the engine block which contains a threaded insert to a coupling 22 which couples the sapphire rod 16 to a low temperature optical transmission cable 24. The low temperature optical transmission cable 24 is shown as having a loop to schematically represent the fact that it may be of indeterminate length. Details concerning the structure and method of operation of optical fiber thermometers of this type are described in detail in the aforementioned U.S. Pat. No. 4,576,486 and in U.S. Pat. No. 4,750,139 entitled "Black Body Radiation Sensing Optical Fiber Thermometer System."

The optical fiber is connected to a signal conditioning network 26 which includes an optical detection circuit 25 comprising a photodiode D1 coupled to the input of amplifier U1 and including shunt capacitor C1 and resistor R1. The output of U1 represents an electrical signal which is a function of the instantaneous sensor temperature within the cylinder head 12, and is indicated by the dashed line 28. This output is subject, however, to a roll off in frequency response at higher frequencies, as will be explained in more detail below.

Figure 3:
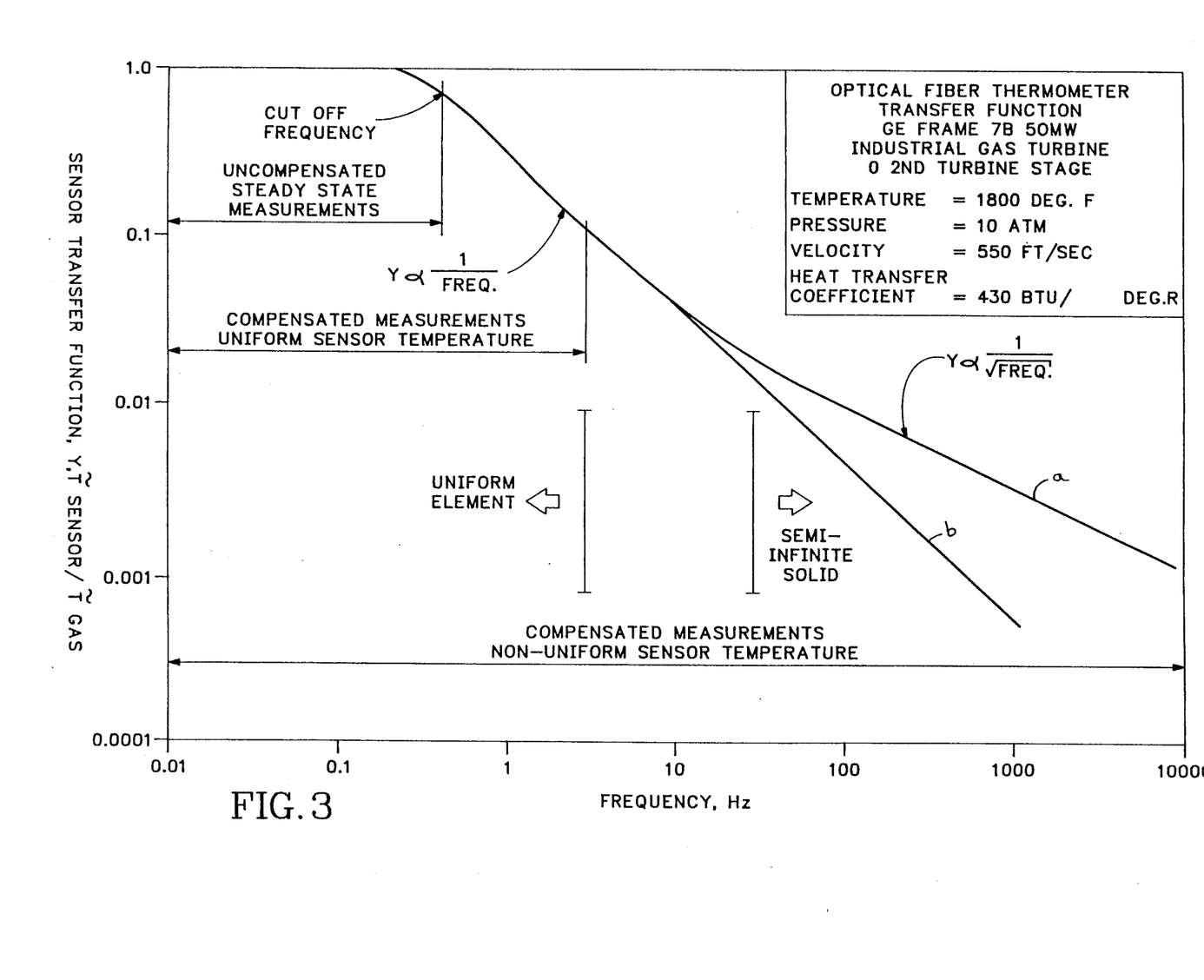
FIG. 3 is a graph showing the transfer function of the black body temperature sensor used in FIG. 1.

Referring to FIG. 3 the black body sensor 18 has a transfer function, Y, which is proporational to the ratio of the temperature of the sensor 18 to the temperature of the gas inside the cylinder 12. This transfer function is unity for very low (below 1 Hz) variations in temperature, but begins to roll off rapidly as the frequency of temperature change rises. When the sensor 18 is treated as having a uniform temperature over its length, its transfer function varies inversely with the frequency. However, at around ten cycles per second, the temperature of the sensor 18 ceases to be uniform and its temperature at any given time must be treated as if it were a semi-infinite solid. In this case the transfer function shifts from one which is proportional to the reciprocal of the frequency to one which is proportional to the reciprocal of the square root of the frequency. This curve is indicated as curve "a" in FIG. 3. A reasonable approximation, however, of the behavior of the sensor temperature at high frequencies is shown in curve "b" which continues to treat the transfer function as if it were proportional to the inverse of the frequency. As will be explained below, for the purposes of the present invention, this approximation may be accurate enough to make the determination as to whether a knock condition exists within the cylinder.

The transfer function of FIG. 3 requires that the signal at the output of U1 be compensated for its output at high frequencies because the higher frequency signals have amplitudes which are too low to be useful. For this reason the sensor temperature signal illustrated by dashed line 28 will rarely be used. Instead, a compensation circuit 30 is used to boost the system's frequency response at high frequencies. The compensation circuit 30 in FIG. 1 has an output which is proportional to the inverse of the sensor transfer function "b" shown in FIG. 3.

Referring to circuit 30 of FIG. 1, the output of U1 is connected to a network comprising capacitor C2 and resistor R2. This network has an impedance which makes it a high pass filter having a cut off frequency equal to $\frac{1}{2}\pi\tau$, where tau is a function of the heat transfer coefficient and the thermal capacity of sensor element 18. Its output is connected to an operational amplifier U2 which includes feedback resistor R3. In essence, this circuit is a differentiator which has an output coupled to line 32 which represents the heat flow to the sensor 18. Heat flow is at a maximum when the rate of change of sensor temperature is the highest. Thus, the circuit has the effect of amplifying the higher frequency components of the sensor output waveform after conversion in the optical detection circuit to an electrical signal.

The heat flow signal on line 32 is digitized in an eight-bit A to D converter 34 and is then modified by a digital programmable compensation circuit 36. This circuit provides compensation adjustment for the output of the A/D converter 34. The compensation curve of a sensor is dependent on the mass flow across the sensor. The programmable compensation circuit 36 takes into account mass flow within the cylinder head 12 which may differ for different types of engines and which may differ with changing engine parameters. The use of circuit 30 in combination with circuit 36 permits a relatively simple and inexpensive 8 bit A/D converter 34 to be used. Engine parameters are provided to a microprocessor-based computing network 38 which includes an engine algorithm to compute mass flow and also to compute the actual engine rpm.

Figure 2:
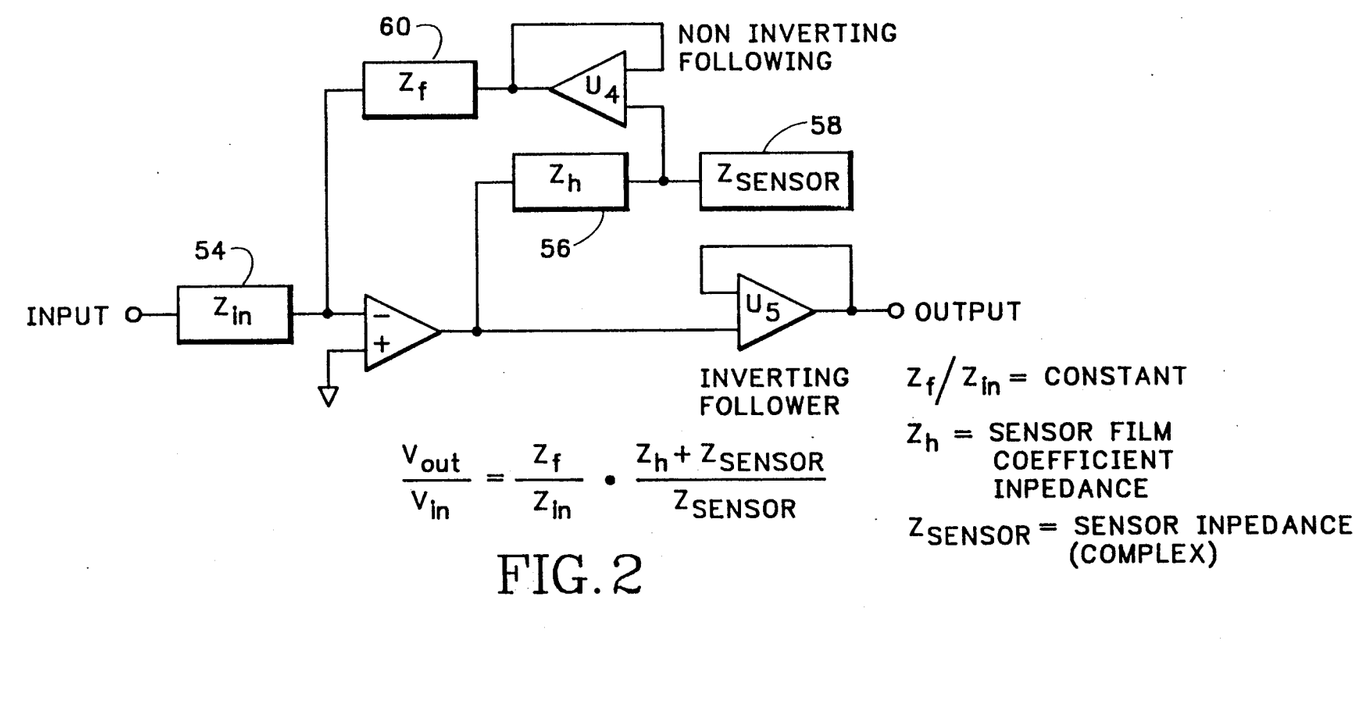
FIG. 2 is an alternative form of a compensation network to be used with the system of FIG. 1.

The compensation network 30 provides a reasonable approximation of the heat flow characteristics of the sensor 18. If desired, however, a more accurate compensation circuit may be used such as that shown in FIG. 2. This circuit includes an input impedance coupled to an amplifier U3. The amplifier output is coupled to an impedance 56 which represents the sensor film co-efficient impedance. The complex impedance of the sensor (black body emitter 18) is represented by network 58 which is coupled to ground. The output of impedance network 56 is coupled to a non-inverting follower amplifier U4 whose output is connected to an impedance network 60 which is then coupled to the output of impedance network 54 at the input to amplifier U3. The output of U3 is also coupled to an inverting follower amplifier U5 whose output is the output of the network. The operation of the network shown in FIG. 2 is given by the mathematical formula at the bottom of the figure. As this formula indicates, the ratio of the output voltage to the input voltage is equal to Zf/Zin which is a constant (both Zf and Zin are resistors), multiplied by the sum of the complex sensor impedance and the sensor film coefficient impedance divided by the sensor impedance. The complex sensor impedance is determined by treating the sensor as a transmission line with a distributed impedance. At higher frequencies the sensor 18 behaves as a semi-infinite solid and may thus be electrically modeled as a plurality of resistors connected in series with capacitors connected to ground between each resistor. The term to the right of the equal sign in FIG. 2 is proportional to the square root of the combustion frequency. Thus, the circuit equalizes the frequency response characteristic of the black body sensor 18 over the particular frequency band of interest, and has a transfer function which is the inverse of curve "a" of FIG. 3.

The output of the programmable compensation network 36 is connected to a plurality of tunable notch filters including a first order filter 40, a second order filter 42, a third order filter 44 and a fifth order filter 46. The notch filters 40, 42, 44 and 46 are center frequency tunable and are responsive to an output of the computer 38 which represents actual engine rpm. The notch filters are tuned so that their center frequencies correspond to the fundamental (filter 40) and higher order harmonics (filters 42, 44, and 46) of the actual combustion frequency. This frequency is equal to one-half the actual engine rpm in a four cycle engine, and exactly equal to the engine rpm in a two cycle engine. The actual engine rpm is measured independently, and is provided via the engine algorithm computer 38 to tune the notch filters 40, 42, 44 and 46 to the correct center frequencies.

Figure 4A:
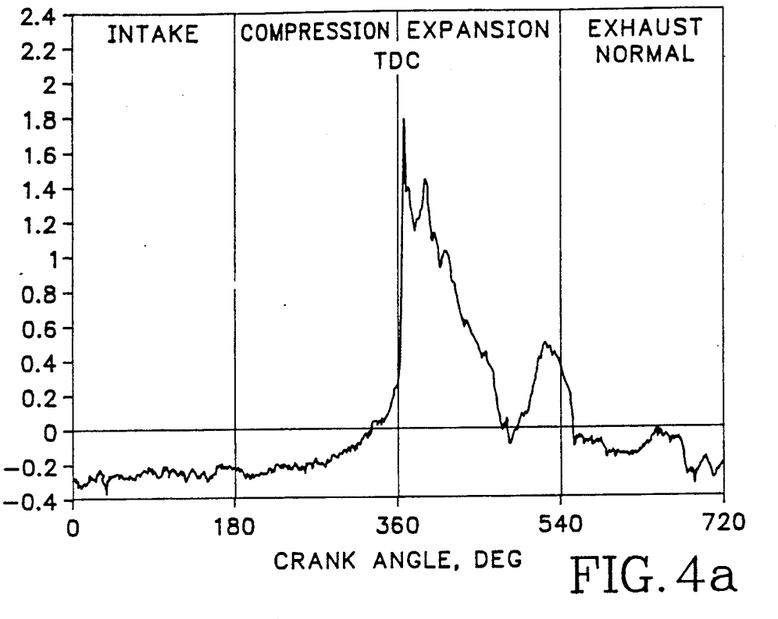
FIG. 4a is a graph of the heat flow waveforms near the top dead center of an engine cylinder during normal conditions.
Figure 4B:
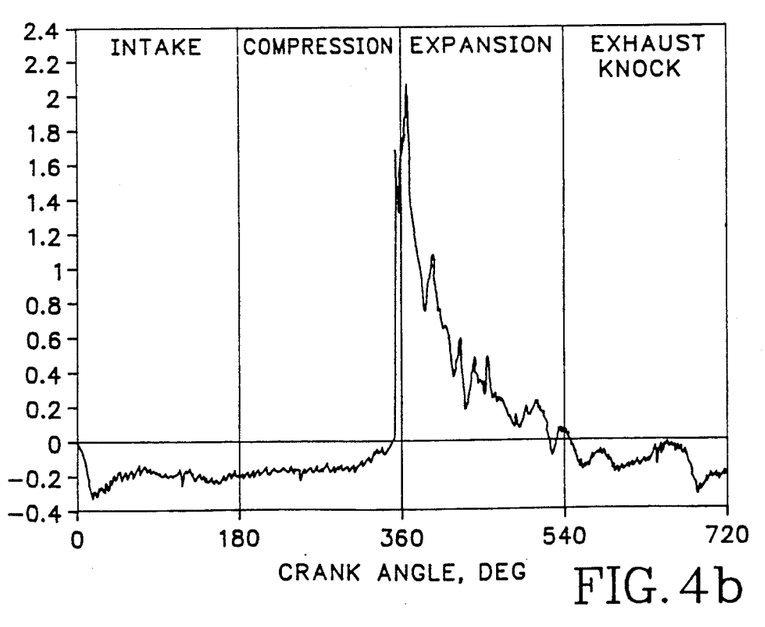
FIG. 4b is a graph of the heat flow waveforms near the top dead center of an engine cylinder during knock conditions.
Figure 5A:
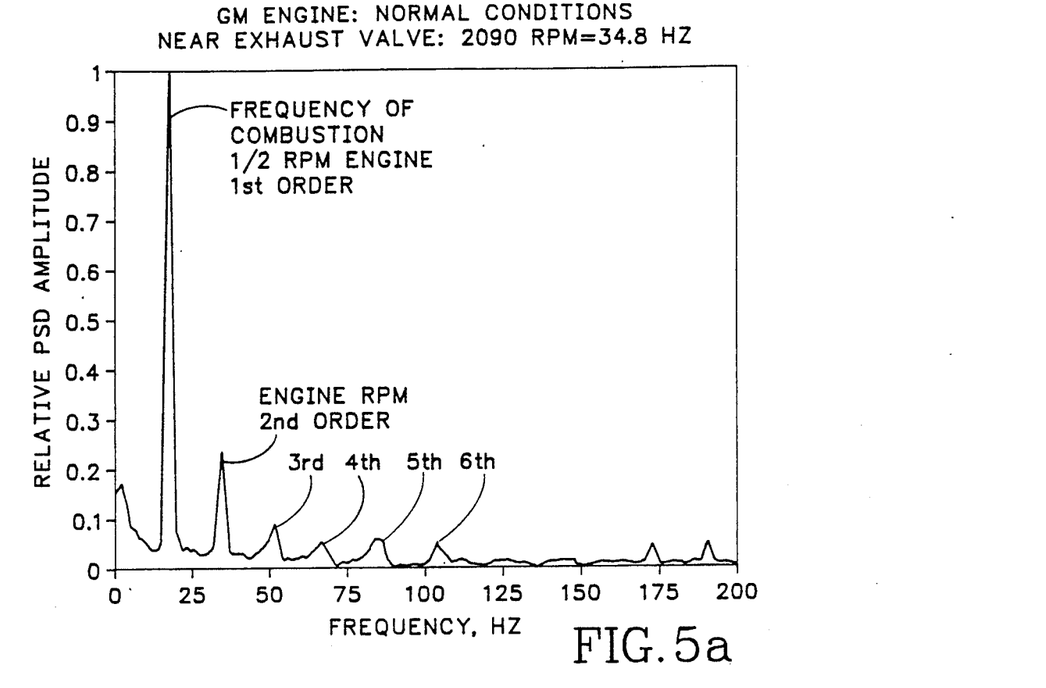
FIG. 5a a graph of the power spectral density of heat flow sensed by the temperature sensor of FIG. 1 during normal engine operating conditions.
Figure 5B:
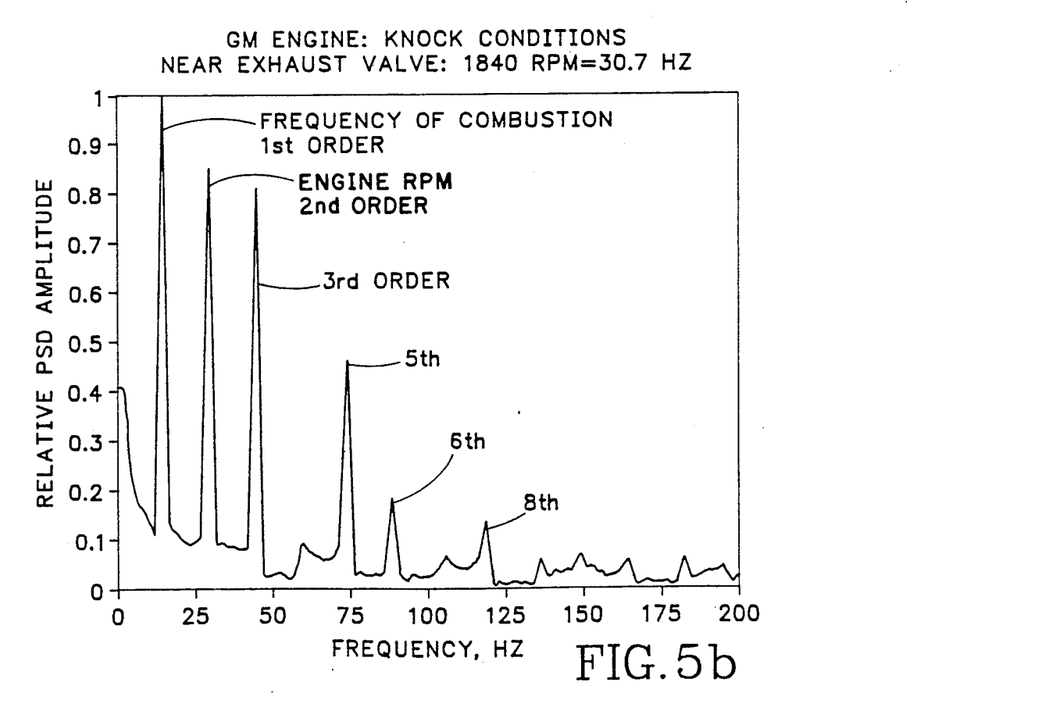
FIG. 5b is a power spectral density graph of heat flow to the temperature sensor of FIG. 1 when a knock condition exists within the cylinder.

During knock, the flame propagates across the engine cylinder at a higher velocity than it does under normal conditions. An example of the change in the heat flow waveforms with and without knock are shown in FIGS. 4b and 4a, respectively. As FIG. 4b shows, when a knock condition exists, the leading edge of the combustion wave is steeper and the heat flow to the sensor occurs over a shorter period of time. This causes the higher order terms of the combustion frequency to increase in amplitude. An example of the associated change in the amplitudes of the higher harmonics combustion frequency encountered during knock is shown in FIGS. 5a and 5b. FIG. 5a represents normal operation and FIG. 5b shows the relative amplitudes of the harmonics during knock. The amplitudes of the second, third and fifth harmonics are much higher than those during normal operation by close to an order of magnitude.

The outputs of the filters are fed to a knock detection and control algorithm circuit 48 which compares the fourier components obtained in the notch filters 40, 42, 44 and 46 with an idealized set of fourier components which represent engine performance under normal conditions. When the relative amplitudes of the measured fourier components exceed the idealized components by some predetermined amount, or exceed a preset threshold, a data signal on line 50 may be provided which may be used to provide data to a remote data acquisition system or a visual or audible warning that knock is occurring. A second output on line 52 may be provided for closed loop systems where it is desired to change some engine parameter in the presence of knock to eliminate the knock condition.

It is possible that alternatives to the programmable notch filters 40, 42, 44 and 46 may be used to obtain the fourier components of the heat flow signal on line 32. This could be accomplished with a fast fourier transform of the compensated heat flow signal using a dedicated FFT integrated circuit or equivalent software in a dedicated microprocessor includable within the control algorithm circuit 48.

Figure 6:
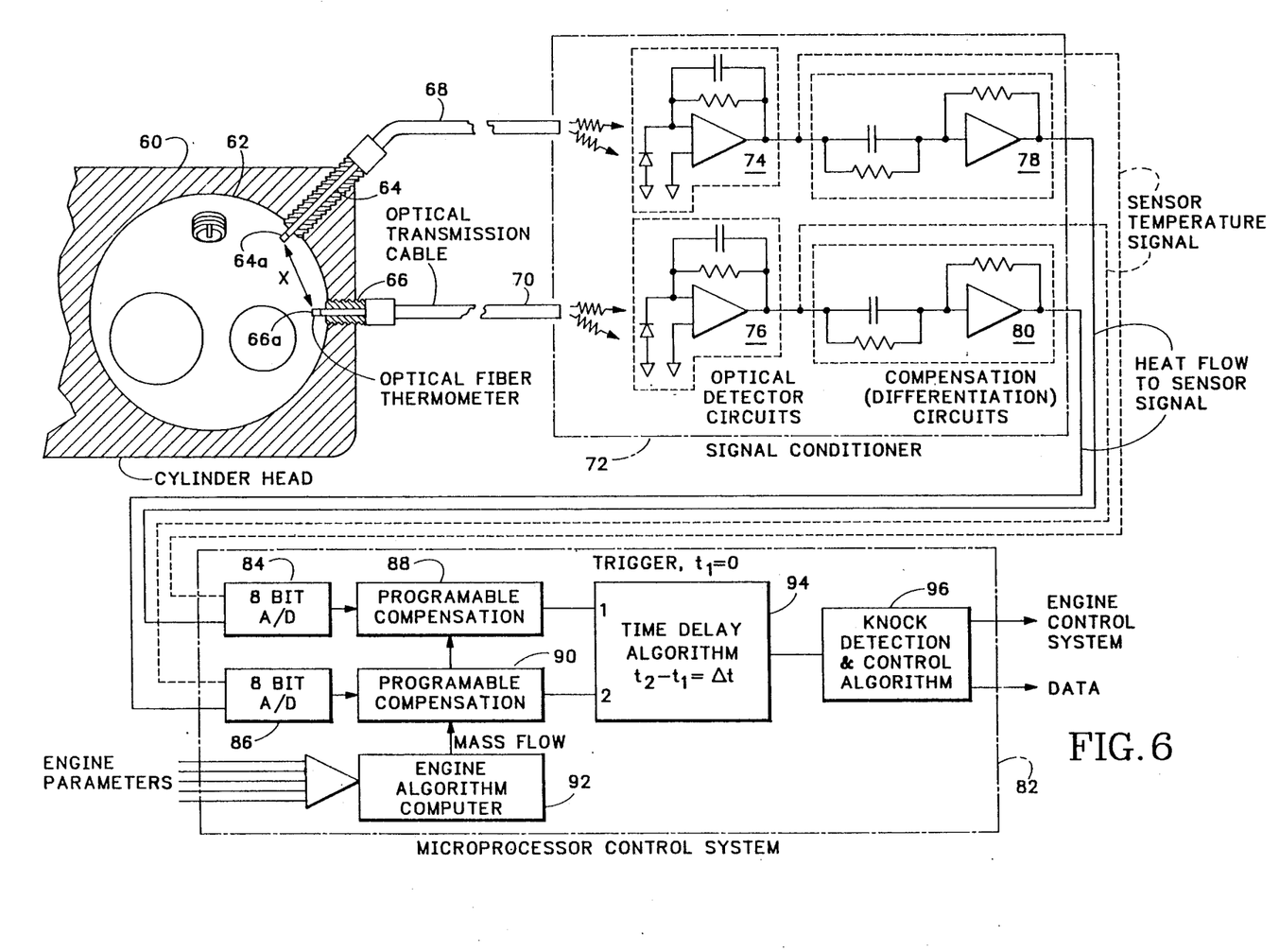
FIG. 6 is a block schematic diagram of an alternative embodiment of the invention using two optical fiber thermometer elements separated a distance apart within an engine cylinder.

FIG. 6 shows an alternate form of the invention which utilizes two sensors to detect the occurrence of a knock condition within an engine cylinder. An engine 60 includes a cylinder head 62. A pair of optical fiber thermometer elements 64 and 66 which are identical in structure to the optical fiber thermometer element of FIG. 1 're situated within the cylinder head 62 so that their respective sensor elements 64a and 66a are situated a distance apart labeled "X" and are coupled through optical transmission cables 68 and 70, respectively, to a signal conditioning circuit 72. The signal conditioning circuit 72 includes photodetection circuits 74 and 76, respectively, which are each identical to the optical detector circuit of FIG. 1. Similarly, each optical detector circuit 74, 76 is coupled to a compensation network of the type shown in FIG. 1. Optical detector 74 is connected to compensation network 78 and optical detection circuit 76 is coupled to compensation network 80. As in FIG. 1, the dashed output lines represent the sensor temperature signal that appears at the output of optical detection circuits 74 and 76, whereas the solid lines which are the outputs of the respective compensation networks 78 and 80 represent the sensor heat flow signals. Each respective signal is connected to a microprocessor control system 82 which includes a pair of 8 bit A/D converters 84 and 86, respectively, and programmable digital compensation circuits 88 and 90, respectively. The 8-bit A/D converters and the programmable digital compensation networks function in the same way as those described in FIG. 1. The programmable digital compensation networks 88 and 90 are responsive to an engine algorithm computer 92 which provides data regarding mass flow from a plurality of engine parameter inputs.

Figure 7A:
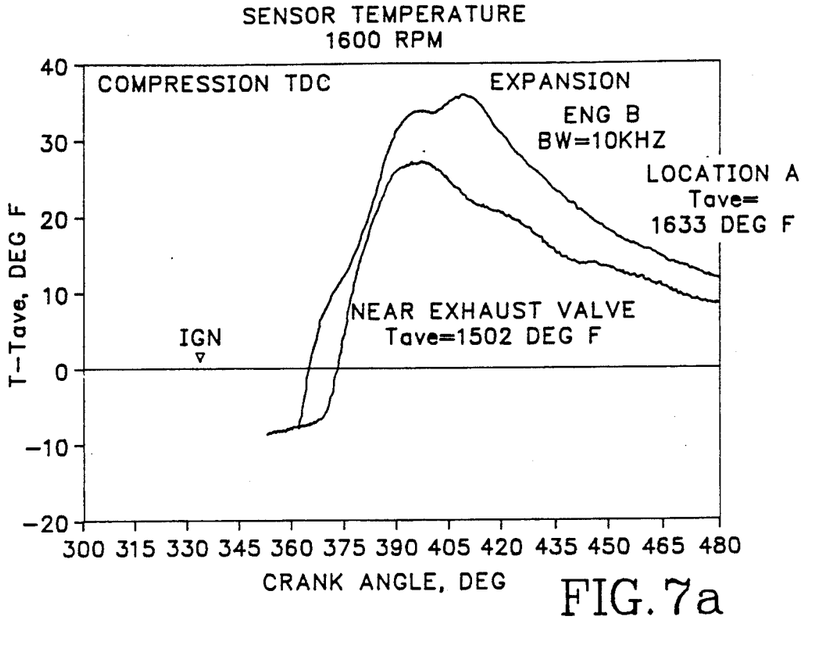
FIG. 7a is a graph illustrating a sensor temperature at the two different locations within the cylinder head.
Figure 7B:
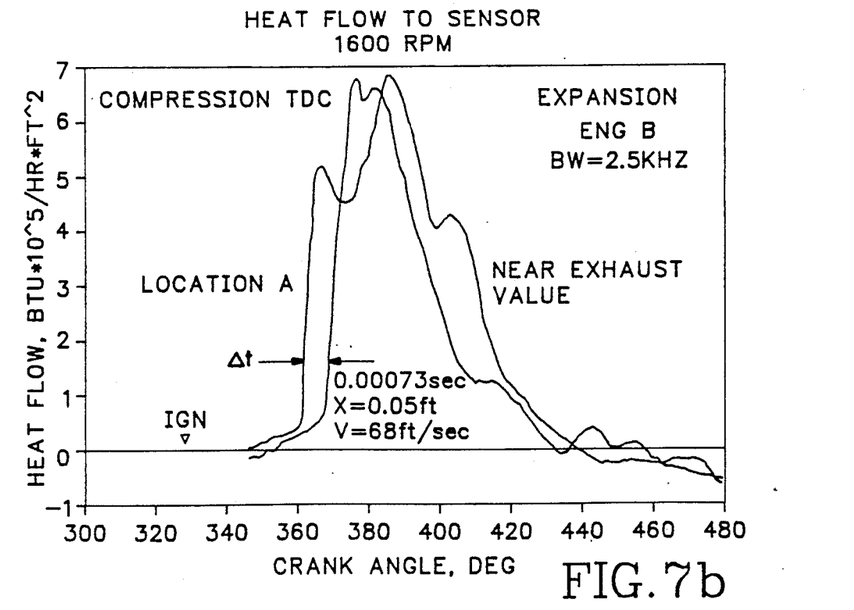
FIG. 7b is a graph that shows heat flow to two different sensor locations within an engine cylinder.

The outputs of the programmable digital compensation networks 88 and 90 are connected to a time delay comparator 94. The comparator 94 calculates the difference in time between the occurrence of a threshold in temperature or heat flow occurring at the locations of the sensors 64a and 66a. FIG. 7b illustrates that the heat flow curves begin to rise sharply at different crank angles where the distance "X" is 0.05 feet. This time differential in the case illustrated amounts to 0.00073 seconds. Once $\neq T$ is calculated, it is fed to a knock detector and control algorithm circuit 96 which in turn provides an output to the engine control system to retard the spark, change the air/fuel mixture or control some other engine parameter to eliminate the knock. Circuit 96 also provides a data signal which may be used to provide a visual or audible knock indication signal, or engineering data for a remote data acquisition system.

The system of FIG. 6 is based upon the characterization of the speed of flame propagation within the cylinder head 62. In the presence of knock the speed of flame propagation increases dramatically from a few meters per second to detonation speeds in excess of several tens of meters per second. Normally, the time difference between the arrival of the propagating flame front at the two sensor locations is one to five milliseconds. In the presence of knock, this time difference reduces to less than 0.01 milliseconds. Since the time differential is more than an order of magnitude, a time difference threshold may be set in circuit 96 that may be measured against the time differential determined in circuit 94 to determine if a knock condition exists. This arbitrary time differential could be as much as an order of magnitude below that which would be expected under normal conditions and still be an order of magnitude above what would be encountered during knock. As with the system described in conjunction with FIG. 1 the approximate compensation network which provides a transfer function which is the inverse of that shown in FIG. 3b may be used and the system will still be accurate enough to detect the presence of a knock condition.

The terms and expressions which have been employed in the foregoing abstract and specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A knock detector for detecting the presence of knock in an internal combustion engine comprising:
   (a) temperature sensing means located in an engine cylinder of the internal combustion engine for sensing variations in temperature therein;
   (b) fourier analysis means coupled to said temperature sensing means for determining the fourier components of the variations in temperature within said engine cylinder over a combustion cycle; and
   (c) detector means for determining when predetermined ones of said fourier components of the measured temperature variations vary with respect to a standard set of levels by a preset amount thereby indicating that a knock condition exists within said engine cylinder.

2. The knock detector of claim 1 wherein said temperature sensing means comprises a black body emitter affixed to the end of an optical fiber.

3. The knock detector of claim 2 wherein said temperature sensing means further includes electro optical detecting means responsive to light emission from said black body emitter for providing an electrical signal representing temperature within said engine cylinder.

4. The knock detector of claim 3, further including compensation network means responsive to the output of said electro optical detecting means for compensating the frequency response of said blackbody emitter for the effect of thermal lag.

5. The knock detector of claim 4 wherein said compensation network means comprises differentiator means for providing an output signal that is a function of the heat flow within the engine cylinder to the black body emitter.

6. The knock detector of claim 4 wherein said black body emitter includes a transfer function, Y, which is proportional to the reciprocal of the transfer function of the black body emitter, and said network compensation means includes circuit means for boosting the effective response of the temperature sensing means by a factor which is proportional to the reciprocal Y.

7. The knock detector of claim 1 wherein said fourier analysis means comprises a set of programmable notch filters, each filter in said set having a nominal frequency that is a fundamental or a harmonic of the combustion frequency.

8. The knock detector of claim 7 wherein the notch filter frequencies comprise the fundamental of the combustion frequency and the second, third and fifth harmonics of the combustion frequency.

9. The knock detector of claim 8, further including interposed between the temperature sensing means and the fourier analysis means an analog-to-digital converter and means including a digital compensation circuit receiving the output of the analog-to-digital converter for providing compensation which is a function of mass flow within the engine cylinder and independent of the frequency of temperature variations within the engine cylinder.

10. The knock detector of either claim 7 or 8 wherein said notch filters have a nominal center frequency which is tunable to an actual center frequency in response to a signal representing actual engine rpm.

11. A knock detector for detecting the presence of knock in an engine cylinder of an internal combustion engine comprising:
(a) temperature sensing means comprising at least one black body emitter situated inside said engine cylinder and coupled to an optical detection circuit by an optical fiber, said optical detection circuit having an output signal representing temperature within said engine cylinder; and
(b) signal processing means for examining at least one parameter of said output signal to determine if a knock condition exists within said engine cylinder, wherein said signal processing means comprises fourier analysis means for dividing said output signal into selected ones of its fourier components and for providing a knock detection signal when the amplitudes of said fourier components differ from amplitudes representing idealized fourier components by a predetermined amount.

12. The knock detector of claim 11 including signal conditioning means for compensating the output of said optical detection circuit for the thermal lag of said black body emitter.

13. The knock detector of claim 12 wherein the compensation provided by said signal conditioning means is approximately equal to the reciprocal of the transfer function of each black body emitter.

14. A method of detecting the presence of knock within an engine cylinder of an internal combustion engine comprising the steps of:
(a) sensing variations in temperature within the engine cylinder over a combustion cycle;
(b) converting said variations in temperature to an electrical signal;
(c) dividing said electrical signal into predetermined ones of its fourier components;
(d) comparing the fourier components obtained during step (c) with a set of preset thresholds; and
(e) providing a signal indicating the presence of knock when said fourier components exceed said thresholds.

15. The method of claim 14, further including the step of compensating the electrical signal for the effect of thermal lag.

16. The method of claim 14 wherein the temperature sensing step of step (a) is accomplished by converting temperature variations within the engine cylinder to an optical signal.

17. A system of monitoring the presence of knock in an internal combustion engine, comprising:
a temperature sensor positioned within a cylinder of said internal combustion engine, said sensor being characterized by providing an electrical signal outside of said cylinder that varies in proportion to temperature within said cylinder,
electronic means receiving said temperature proportional electrical signal for measuring a level of components thereof within at least one defined frequency band that includes only one harmonic of a combustion frequency of the engine, and
means receiving the measured signal level for comparing said signal level with a characteristic level of said electrical signal when the engine is known to be operating without knock, thereby to provide an indication when engine knock is present.

18. A system of monitoring the presence of knock in an internal combustion engine, comprising:
a temperature sensor positioned within a cylinder of said internal combustion engine, said sensor being characterized by providing an electrical signal outside of said cylinder that varies in proportion to temperature within said cylinder,
means responsive to operation of the engine for providing a control signal proportional to a frequency of combustion within said engine cylinder,
electronic means receiving both said electrical signal and said control signal for measuring levels of the temperature proportional electrical signal within a plurality of non-overlapping frequency bands related to said combustion frequency, and
means receiving the measured signal levels within the plurality of electronic signal frequency bands for comparing said levels with characteristic levels thereof, thereby to provide an indication when engine knock is present.

19. The system according to claim 18 wherein said signal level measuring means includes means for measuring levels of the temperature proportional electrical signal within a first frequency band including the engine combustion frequency and within at least a second frequency band including a harmonic of said engine combustion frequency.

20. The system according to claim 18 wherein the plurality of non-overlapping frequency bands of said signal level measuring means includes a plurality of bands including a distinct harmonic of said engine combustion frequency.

21. The system according to any one of claim 17 wherein said temperature sensor includes a black body radiation emitter affixed to an end of an optical fiber positioned within said cylinder, and an electro-optical detector positioned outside of said cylinder to receive said radiation through the optical fiber and generate said electrical signal proportional thereto.

22. The system according to any one of claim 17-20 which additionally includes means receiving said electrical signal for compensating the frequency response of said sensor for the effect of thermal lag before applying said electrical signal to said electronic measuring means.

23. A method of detecting the presence of knock within an engine cylinder of an internal combustion engine, comprising the steps of:

(a) observing from outside said cylinder a radiation signal thermally generated within said cylinder;

(b) converting the observed radiation signal into an electrical signal proportional thereto;

(c) dividing said electrical signal into specific fourier components related to a frequency of combustion within said engine cylinder and maintaining said fourier components in relationship to the frequency of combustion as the engine speed varies;

(d) comparing the fourier components obtained during step (c) with a set of preset thresholds; and (e) providing a signal indicating the presence of knock when said fourier components exceed said thresholds.

24. The method according to claim 23 wherein step (c) additionally includes dividing the electrical signal into a plurality of non-overlapping frequency bands including harmonics of said frequency of combustion.

* * * * *

UNITED STATES PATENT AND TRADEMARK OFFICE
CERTIFICATE OF CORRECTION

PATENT NO.   : 5,052,214
DATED        : OCTOBER 1, 1991
INVENTOR(S)  : Ray R. Dils It is certified that error appears in the above-identified patent and that said Letters Patent is hereby corrected as shown below:

Column 10, line 66, in Claim 21:   replace "claim 17" with --claims 17-20--

Column 11, line 6, in Claim 22:   replace "claim" with --claims--

Signed and Sealed this

Twenty-sixth Day of January, 1993

Attest:

STEPHEN G. KUNIN

*Attesting Officer*   Acting Commissioner of Patents and Trademarks